(12) United States Patent
Wang et al.

(10) Patent No.: US 12,466,769 B2
(45) Date of Patent: Nov. 11, 2025

(54) METHODS OF FORMING ASPHALT PAVEMENT USING FOAMED ASPHALT COMPOSITIONS

(71) Applicant: HONEYWELL INTERNATIONAL INC., Charlotte, NC (US)

(72) Inventors: Wei Wang, Shanghai (CN); Ruixing Yuan, Shanghai (CN); Yuansheng Shen, Shanghai (CN); Xiang Wang, Shanghai (CN); Jun Li, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1002 days.

(21) Appl. No.: 17/644,122

(22) Filed: Dec. 14, 2021

(65) Prior Publication Data

US 2022/0106229 A1 Apr. 7, 2022

Related U.S. Application Data

(63) Continuation of application No. 15/370,683, filed on Dec. 6, 2016, now abandoned.

(Continued)

(51) Int. Cl.
*C04B 26/26* (2006.01)
*C04B 24/26* (2006.01)
(Continued)

(52) U.S. Cl.
CPC .......... *C04B 26/26* (2013.01); *C04B 24/2611* (2013.01); *C08L 95/00* (2013.01);
(Continued)

(58) Field of Classification Search
CPC ....... E01C 7/18; C04B 24/2611; C04B 26/26; C04B 2111/0075; C08L 95/00;
(Continued)

(56) References Cited

U.S. PATENT DOCUMENTS 3,177,164 A 4/1965 Mills
3,619,258 A 11/1971 Bennett et al.
(Continued)

FOREIGN PATENT DOCUMENTS

CN 1757828 A 4/2006
CN 1948398 A 4/2007
(Continued)

OTHER PUBLICATIONS

Honeywell Polymer Data Sheet for Titan 7205; Website: www.honeywell-titan.com; 2013 Honeywell International Inc. (Year 2013).
(Continued)

*Primary Examiner* — Raymond W Addie
(74) *Attorney, Agent, or Firm* — Ingrassia, Fisher & Lorenz | IF&L

(57) ABSTRACT

Foamed asphalt compositions, recycled asphalt compositions, asphalt pavement, and methods of forming asphalt pavement using the foamed asphalt compositions are provided herein. An exemplary foamed asphalt composition is in a cellular matrix form and includes a base asphalt component and oxidized high density polyethylene. An exemplary asphalt pavement includes a recycled asphalt layer that includes the foamed asphalt composition and a recycled asphalt component. An exemplary method of forming asphalt pavement includes combining a base asphalt component and an oxidized high density polyethylene to form an asphalt mixture. The asphalt mixture is foamed using water and compressed air to form a foamed asphalt composition. The foamed asphalt composition and a recycled asphalt component are combined to form a recycled asphalt composition. A recycled asphalt layer is formed with the recycled asphalt composition.

12 Claims, 2 Drawing Sheets

Related U.S. Application Data

(60) Provisional application No. 62/273,742, filed on Dec. 31, 2015.

(51) Int. Cl.
  *C08L 95/00* (2006.01)
  *E01C 7/18* (2006.01)
  *B01F 25/31* (2022.01)
  *B01F 101/38* (2022.01)
  *B09B 101/40* (2022.01)
  *C04B 111/00* (2006.01)

(52) U.S. Cl.
  CPC ............ *E01C 7/18* (2013.01); *B01F 25/3111* (2022.01); *B01F 2101/38* (2022.01); *B09B 2101/40* (2022.01); *C04B 2111/0075* (2013.01); *C08L 2555/30* (2013.01); *C08L 2555/34* (2013.01); *Y02W 30/91* (2015.05)

(58) Field of Classification Search
  CPC ............ C08L 2555/30; C08L 2555/34; B01F 25/3111; B01F 2101/40; Y02W 30/91
  USPC .............................................. 404/17, 31, 75
  See application file for complete search history.

(56) References Cited

U.S. PATENT DOCUMENTS

| | | | |
|---|---|---|---|
| 5,118,733 A | 6/1992 | Gelles et al. | |
| 6,027,557 A | 2/2000 | Hayner | |
| 7,297,720 B2* | 11/2007 | Meyers, III | B29B 17/04 524/68 |
| 8,454,739 B2 | 6/2013 | Reinke | |
| 8,658,717 B2 | 2/2014 | Rotz et al. | |
| 8,962,071 B2 | 2/2015 | Reinke et al. | |
| 9,267,038 B2 | 2/2016 | Hacker et al. | |
| 2001/0022919 A1* | 9/2001 | Bruns | B05B 15/52 404/90 |
| 2007/0054987 A1* | 3/2007 | Zanchetta | C08L 95/00 524/515 |
| 2007/0191514 A1 | 8/2007 | Reinke et al. | |
| 2010/0055304 A1 | 3/2010 | Reinke et al. | |
| 2011/0287159 A1 | 11/2011 | Hassan et al. | |
| 2013/0195552 A1 | 8/2013 | McDade et al. | |
| 2013/0276668 A1 | 10/2013 | Ranka et al. | |
| 2014/0069297 A1 | 3/2014 | Rotz et al. | |
| 2014/0186116 A1* | 7/2014 | Hacker | C08L 95/00 404/75 |
| 2014/0196959 A1 | 7/2014 | Hall et al. | |
| 2014/0286705 A1* | 9/2014 | Reinke | E01C 19/10 404/79 |
| 2014/0360406 A1 | 12/2014 | Kutay et al. | |
| 2014/0369749 A1* | 12/2014 | Friedman | C08K 11/00 404/72 |
| 2015/0147118 A1 | 5/2015 | Reinke et al. | |
| 2015/0191597 A1 | 7/2015 | Hacker et al. | |
| 2016/0201271 A1* | 7/2016 | Clopotel | E01C 23/06 404/75 |
| 2016/0201274 A1* | 7/2016 | Mollick | E01C 19/1004 106/273.1 |
| 2021/0113977 A1* | 4/2021 | Shi | B01F 27/116 |

FOREIGN PATENT DOCUMENTS

| | | |
|---|---|---|
| CN | 101591881 A | 12/2009 |
| CN | 101602583 A | 12/2009 |
| CN | 101693608 B | 4/2010 |
| CN | 101768914 A | 7/2010 |
| CN | 102071630 A | 5/2011 |
| CN | 102493316 A | 6/2012 |
| CN | 102505608 A | 6/2012 |
| CN | 102505609 A | 6/2012 |
| CN | 202440733 U | 9/2012 |
| CN | 103102108 A | 5/2013 |
| CN | 103254652 A | 8/2013 |
| CN | 203451971 U | 2/2014 |
| EP | 2385079 A1 | 9/2011 |
| GB | 2472995 A | 3/2011 |
| JP | 4560774 B2 | 10/2010 |
| WO | 00/23522 | 4/2000 |
| WO | 01/62852 A1 | 8/2001 |
| WO | 2006107179 A2 | 10/2006 |
| WO | 2009033060 A1 | 3/2009 |
| WO | 2012103206 A2 | 8/2012 |

OTHER PUBLICATIONS

Anonymous, The Use of Warm Mix Asphalt, EAPA Position Paper, 2014, pp. 1-23, Retrieved from the Internet: URL: https://eapa.org/wp-content/uploads/20 18/07/EAPA-paper-Warm-Mix-Asphalt-version- 2014-1.pdf.

Ozturk, Quantification of Quality of Foamed Warm Mix Asphalt Binders and Mixtures, 2013, pp. 1-232, Retrieved from the Internet: URL: https://d.lib.msu.edu/etd/224/datastream/OBJ/download/Quantificationpfqualityoffoamed WarmMixAsphaltbindersandmixtures.pdf.

Kheradmand et al., An overview of the Emerging Warm Mix Asphalt Technology, International Journal Of Pavement Engineering, Sep. 20, 2013, vol. 15, No. 1, pp. 79-94.

Rubio et al., Warm Mix Asphalt: An Overview, Journal Of Cleaner Production, Nov. 17, 2011, vol. 24, pp. 76-84, Granda, Spain.

Koshi et al., Study on the Improved Recycled Asphalt Mixtures by Microbubble-foamed Asphalt, Aspahlt Pavements, 2014, pp. 709-720.

Jones et al., Project Selection Guidelines For Road Rehabilitation Through Full-Depth Reclamation With Foamed Asphalt, Transportation Research Record 2204, Dec. 2011, pp. 104-205, Washington, DC.

Halles et al., Degree Of Influence Of Active Fillers On Properties Of Recycled Mixes With Foamed Asphalt, Transportation Research Record 2095, Jan. 2009, pp. 127-135, Washington, DC.

Brennen et al., Laboratory Investigation of the Use of Foamed Asphalt for Recycled Bituminous Pavements, Transportation Research record 911, Jan. 1983, pp. 80-87, Retrieved from the Internet: URL: http://asphalt.csir.co.za/FArefs/Brennenetal.pdf.

Roberts et al., Evaluation of Recycled Mixtures Using Foamed Asphalt, Transportation Research Record 968, May 1985, pp. 78-85, Retrieved from the Internet: URL:http://asphalt.csir.co.za/FArefs/Robertsetal.pdf.

Fang C., "Research on the Pavement Performance of Modified Asphalt by Waste Polyethylene in Packaging," Retreived from Internet 2006: <http://en.cnki.com.cn/Article_en/CJFDTOTAL-BZGC200606045.htm>.

U.S. Army, "User's Guide: Cold-Max Recylcling of Asphalt Concrete Pavements," Facilities Engineering Application Programs, Sep. 1992.

PCT International Search Report for PCT/US2016/067845 mailed Apr. 10, 2017.

\* cited by examiner

METHODS OF FORMING ASPHALT PAVEMENT USING FOAMED ASPHALT COMPOSITIONS

CROSS-REFERENCE TO RELATED APPLICATIONS

This application is a continuation of U.S. application Ser. No. 15/370,683, filed Dec. 6, 2016, which claims the benefit of U.S. Provisional Application No. 62/273,742, filed Dec. 31, 2015.

TECHNICAL FIELD

The technical field generally relates to foamed asphalt compositions, recycled asphalt composition including the foamed asphalt compositions, asphalt pavement including the foamed asphalt compositions, and methods of forming asphalt pavement using the foamed asphalt compositions. More particularly, the technical field relates to foamed asphalt compositions that provide asphalt pavement with excellent anti-deformation performance and methods of forming asphalt pavement using the foamed asphalt compositions.

BACKGROUND

Asphalt compositions are commonly employed as paving materials for road construction and maintenance. Typically, asphalt, often referred to as "asphalt binder" or "asphalt cement", is mixed with aggregate to form material used in asphalt paving. Processing and use of this material by paving crews yields asphalt pavement. Asphalt pavement conventionally includes a layer of aggregate held within a continuous phase of the asphalt by adherence of the asphalt to the aggregate.

Asphalt pavement formed in accordance with road maintenance or replacement often includes a recycled asphalt layer as a base layer that is disposed underneath a conventional hot mix asphalt (HMA) layer. Cold recycling techniques, including cold-in-place and cold-in-plant techniques, are commonly employed to form the recycled asphalt layer whereby recycled asphalt pavement (RAP) is pulverized and reconstituted with a foamed asphalt composition, amongst other optional components such as active filler (e.g., cement, lime, and the like) and fresh aggregate. The foamed asphalt composition enables generally homogenous mixing and binding of the RAP and other optional components at ambient processing temperatures of from about 10° C. to about 50° C. Processing at such relatively low temperatures, hereinafter deemed "low-temperature" or "cold" processing, enables energy consumption and hazard emissions to be minimized and also enables more RAP to be used instead of fresh aggregate while still achieving target physical performance.

Presently, foamed asphalt compositions that are employed to form the recycled asphalt layer consist of water and asphalt. It has generally been accepted that no further modifiers, e.g., elastomeric additives, can be included in the foamed asphalt compositions because such additives inhibit effective foaming. However, recycled asphalt layers formed using conventional foamed asphalt compositions generally exhibit poor permanent deformation resistance, resulting in rut formation over time in the asphalt pavement especially for asphalt pavement that is subject to heavy traffic loads and channelized traffic. To account for rutting tendencies attributable to the recycled asphalt layers, thickness of the HMA layer is generally adjusted to meet anti-rutting performance targets with HMA layer thicknesses in excess of 8 cm typical for purposes of achieving anti-rutting performance of at least 5000 cycles/mm as measured in accordance with T0719-2011 of the Industry Standard JTG E20-2011 Specification and Test Methods of Bitumen and Bituminous Mixture for Highway Engineering, China.

Accordingly, it is desirable to provide foamed asphalt compositions, recycled asphalt compositions, asphalt pavement, and methods of forming asphalt pavement using the foamed asphalt compositions with maximized anti-rutting performance. Furthermore, other desirable features and characteristics will become apparent from the subsequent detailed description and the appended claims, taken in conjunction with the accompanying drawings and this background.

BRIEF SUMMARY

Foamed asphalt compositions, recycled asphalt compositions, asphalt pavement, and methods of forming asphalt pavement using the foamed asphalt compositions are provided herein. In an embodiment, a foamed asphalt composition includes a base asphalt component and oxidized high density polyethylene. The foamed asphalt composition is in a cellular matrix form.

In another embodiment, an asphalt pavement includes a recycled asphalt layer. The recycled asphalt layer includes a foamed asphalt composition and a recycled asphalt component. The foamed asphalt composition includes a base asphalt component and oxidized high density polyethylene.

In another embodiment, a method of forming asphalt pavement includes combining a base asphalt component and an oxidized high density polyethylene to form an asphalt mixture. The asphalt mixture, water, and compressed air are foamed to form a foamed asphalt composition. The foamed asphalt composition and a recycled asphalt component are combined to form a recycled asphalt composition. A recycled asphalt layer is formed with the recycled asphalt composition.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
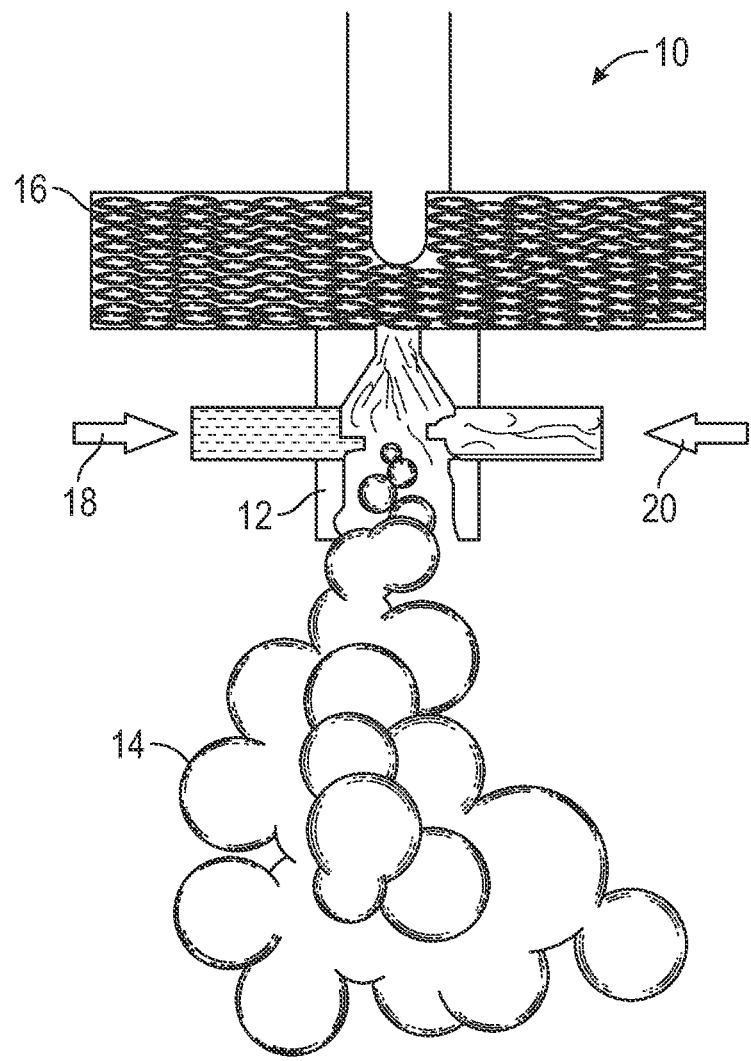
FIG. 1 is a schematic drawing of asphalt foaming equipment and a process of forming a foamed asphalt composition in accordance with an embodiment.

The following detailed description is merely exemplary in nature and is not intended to limit the foamed asphalt compositions, asphalt pavement including the foamed asphalt compositions, and methods of forming asphalt pavement using the foamed asphalt compositions. Furthermore, there is no intention to be bound by any theory presented in the preceding background or the following detailed description.

Foamed asphalt compositions, recycled asphalt compositions, asphalt pavement, and methods of forming asphalt pavement using the foamed asphalt compositions are provided herein that provide maximized anti-rutting performance. In particular, the foamed asphalt compositions include oxidized high density polyethylene (OxHDPE), in addition to a base asphalt component, with the OxHDPE providing maximized anti-rutting performance to recycled asphalt layers that are formed using the foamed asphalt compositions and recycled asphalt pavement (RAP). Foamed asphalt compositions, as referred to herein, are in cellular matrix form and may be formed by foaming an asphalt mixture of the base asphalt component and OxHDPE using compressed air, water, and a foam nozzle. RAP, as referred to herein, is pulverized asphalt pavement obtained from an existing structure (e.g., an existing road, parking lot, etc.) that is being repaired, replaced, or removed. When used in asphalt pavement that includes a hot mix asphalt (HMA) layer overlying the recycled asphalt layer, the maximized anti-rutting performance of the recycled asphalt layers described herein enables target anti-rutting performance to be achieved with thinner HMA layers than have conventionally been necessary to meet the target anti-rutting performance for the asphalt pavement. Further, in embodiments, an additional polyethylene different from the oxidized high density polyethylene and chosen from oxidized low density polyethylene (OxLDPE), non-oxidized polyethylene homopolymer, or a combination thereof is also included in the foamed asphalt compositions in addition to the OxHDPE. The additional polyethylene unexpectedly provides the recycled asphalt layers with maximized indirect tensile strength and minimizes viscosity of the foamed asphalt composition at 160° C. to enhance surface coating of the RAP, thereby further enhancing the recycled asphalt layers as compared to conventional recycled asphalt layers.

As alluded to above, the foamed asphalt compositions include the base asphalt component and OxHDPE. The base asphalt component, as referred to herein, is neat asphalt that is free of polymers. The neat asphalt is often a byproduct of petroleum refining or post refining operations and includes air-blown asphalt, blended asphalt, cracked or residual asphalt, petroleum asphalt, propane asphalt, straight-run asphalt, thermal asphalt, and the like. In embodiments, the base asphalt component is present in the foamed asphalt composition in an amount of from about 88 to about 98 weight %, such as from about 92 to about 98 weight %, based upon a total weight of the foamed asphalt composition on a dry basis.

The OxHDPE is provided in the foamed asphalt composition to provide maximized anti-rutting performance to the recycled asphalt layer formed using the foamed asphalt composition. In embodiments, the OxHDPE, as referred to herein, is oxidized polyethylene having a density of from about 0.97 to about 1.01 g/cm$^3$. In embodiments, the OxHDPE has a number average molecular weight ($M_n$) of from about 1000 to about 30,000 Daltons, such as from about 1000 to about 10,000 Daltons. Further, in embodiments, the OxHDPE may have a degree of oxidation, e.g., carboxyl group content as indicated by acid number, of from about 5 to about 50 (e.g. acid value of about 5 to about 50 mg KOH/g), and more preferably of from about 15 to about 40 (e.g. acid value of about 15 to about 40 mg KOH/g). Acid number may be determined by titrating a solution of the OxHDPE with a 0.1 N alcoholic potassium hydroxide (KOH) solution to a visual "pink" end point using phenolphthalein as an indicator in accordance with conventional techniques. In embodiments, the OxHDPE has a viscosity of from about 100 to about 20000 cP at 150° C. as measured in accordance with ASTM D4402. Examples of suitable OxHDPE include, but are not limited to, Honeywell Titan® 7456, Honeywell Titan® 7686, Honeywell Titan® 7376, Honeywell Titan® 7608, Honeywell Titan® 7709, and Honeywell Titan® 7410 oxidized high-density polyethylene homopolymers, manufactured by Honeywell International Inc., which is headquartered in Morristown, N.J.

In embodiments, the foamed asphalt composition further includes an additional polyethylene that is different from the oxidized high density polyethylene. The additional polyethylene may be provided in the foamed asphalt composition to adjust physical properties other than anti-rutting of recycled asphalt layers that include the foamed asphalt composition. More specifically, it was found that by including OxHDPE in the foamed asphalt composition, indirect tensile strength (ITS) of the recycled asphalt layers formed using the foamed asphalt composition is reduced as compared to conventional recycled asphalt layers formed using conventional foamed asphalt compositions. However, it was also unexpectedly found that by including the additional polyethylene, ITS performance of at least equal to that of conventional recycled asphalt layers formed using conventional foamed asphalt compositions can be achieved, often with increased ITS performance observed. It is believed that ITS correlates to potential for cracking and field pavement moisture damage.

The additional polyethylene may be chosen from non-oxidized polyethylene homopolymer, oxidized low density polyethylene (OxLDPE), or a combination thereof. In embodiments, the additional polyethylene is OxLDPE and may have a density of from about 0.84 to about 0.95 g/cm$^3$. In embodiments, the OxLDPE has a number average molecular weight ($M_n$) of from about 1000 to about 10000 Daltons, such as from about 1000 to about 5000 Daltons. Further, in embodiments, the OxLDPE may have a degree of oxidation, e.g., carboxyl group content as indicated by acid number, of from about 5 to about 30 (e.g. acid value of about 5 to about 30 mg KOH/g), and more preferably of from about 10 to about 20 (e.g. acid value of about 10 to about 20 mg KOH/g). Acid number may be determined by titrating a solution of the OxLDPE with a 0.1 N alcoholic potassium hydroxide (KOH) solution to a visual "pink" end point using phenolphthalein as an indicator in accordance with conventional techniques. In other embodiments, the additional polyethylene is the non-oxidized polyethylene homopolymer and may have a density of from about 0.87 to about 0.98 g/cm$^3$ and a viscosity of from about 10 to about 7000 cP at 140° C. as measured in accordance with ASTM D4402. Specific examples of suitable additional polyethylenes include Honeywell Titan® 7183, Honeywell Titan® 7595, and Honeywell Titan® 7984 oxidized low density polyethylene and Honeywell Titan® 7287, Honeywell Titan® 7205, and Honeywell Titan® 7467 non-oxidized polyethylene homopolymer.

In embodiments, a combined amount of all polymeric species present in the foamed asphalt composition (i.e., a total amount of all OxHDPE and additional polyethylene) is from about 2 to about 10.5 weight %, such as from about 2 to about 8 weight %, based upon a total weight of the foamed asphalt composition on a dry basis. In embodiments, a weight ratio of OxHDPE to additional polyethylene in the foamed asphalt composition is from about 1:3 to about 2:1, such as from about 1:2 to about 2:1 or from about 1:3 to about 1:1.

In an embodiment and referring to FIG. 1, using conventional asphalt foaming equipment 10 including a foam nozzle 12, the foamed asphalt composition 14 is produced by introducing an asphalt composition 16 including the base asphalt component, the OxHDPE, and optionally the additional polyethylene to the foam nozzle 12. In the embodiment shown, the OxHDPE and optional additional polyethylene are incorporated with the base asphalt component 16 to form the asphalt mixture 16. The asphalt mixture 16 is foamed using water 18 and compressed air 20 to form the foamed asphalt composition 14 in cellular matrix form. In embodiments, the asphalt composition 16 is heated to a temperature of from about 150° C. to about 170° C. and is pumped under pressure, e.g., at a pressure of about 0.3 MPa, to a mixing zone where the asphalt composition 16 is mixed with water 18 and compressed air 20. In embodiments, the water 18 is mixed with the asphalt mixture 16 in an amount of from about 2 to about 5 weight %, such as from about 2 to about 4 weight %, based upon a combined total weight of the water and all components present in the asphalt mixture 16. In embodiments, the temperature of the asphalt mixture 16 during foaming (i.e., at an outlet from the foaming nozzle) is from about 140 to about 180° C., such as from about 155to about 165° C.

In embodiments, the asphalt mixture 16 includes the additional polyethylene and the asphalt mixture 16 has a viscosity of at least about 30,000 Pa·s at a temperature of 60° C. and a viscosity of less than about 150 cP at a temperature of 160° C., wherein viscosity is determined in accordance with ASTM D4402. It has been found that the presence of the additional polyethylene may decrease the viscosity of the asphalt mixture 16 at 160° C. as compared to embodiments in which only the OxHDPE is present to the exclusion of the additional polyethylene. The temperature of 160° C. is a typical temperature of the base asphalt component 16 during foaming, and without being bound by any particular theory, it is believed that the decreased viscosity of the asphalt mixture 16 at that temperature results in more effective foaming and better coating of RAP during formation of the recycled asphalt layer 24, thereby leading to maximized ITS performance. Additionally, the OxHDPE maximizes viscosity of the asphalt mixture 16 at a temperature of about 60° C. and, without being bound by any particular theory, it is believed that maximized viscosity of the asphalt mixture 16 at 60° C. leads to maximized anti-rutting performance. As such, it is believed that the presence of both the OxHDPE and the additional polyethylene maximizes anti-rutting and ITS performance of recycled asphalt layers and, in turn, asphalt pavement 22 including the recycled asphalt layers.

Figure 2:
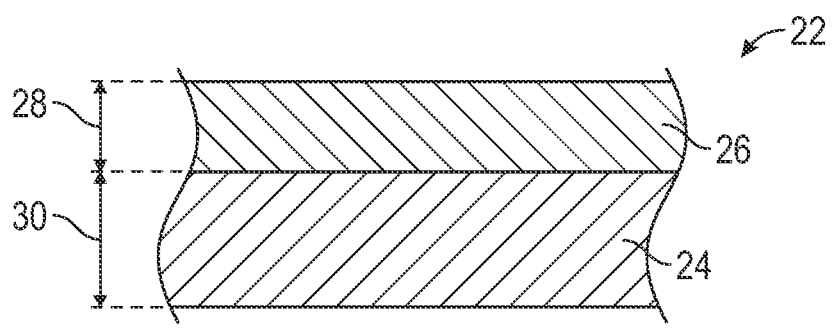
FIG. 2 is a schematic cross-sectional side view of asphalt pavement in accordance with an embodiment.

In embodiments and referring to FIG. 2 with continued reference to FIG. 1, the foamed asphalt composition 14 is employed in recycled asphalt compositions, which is in turn employed in asphalt pavement 22 that includes a recycled asphalt layer 24 and a hot mix asphalt (HMA) layer 26 disposed over the recycled asphalt layer 24. In embodiments, the recycled asphalt composition and the recycled asphalt layer 24 include the foamed asphalt composition 14 and a recycled asphalt component, such as RAP. Additional components may also be included in the recycled asphalt composition such as, but not limited to, active filler and fresh aggregate. Suitable active fillers include, but are not limited to, cement, lime, and the like. "Aggregate" is a collective term for mineral materials, such as, for example, sand, gravel, or crushed stone that are combined with the asphalt binder to form the asphalt paving material. The aggregate may comprise natural aggregate, manufactured aggregate, or a combination thereof. Natural aggregate is typically extracted rock from an open excavation (e.g. a quarry) that is reduced to usable sizes by mechanical crushing. Manufactured aggregate is typically a byproduct of other manufacturing processes such as slag from metallurgical processing (e.g. steel, tin, and copper production). Manufactured aggregate also includes specialty materials that are produced to have a particular physical characteristic not found in natural rock, such as, for example, low density.

In embodiments, the recycled asphalt layer 24 is formed from the recycled asphalt composition that includes the foamed asphalt composition in an amount of from about 2 to about 5 weight %, such as from about 2 to about 4 weight %, based on the total weight of the recycled asphalt composition. The recycled asphalt component may be present in the recycled asphalt composition in an amount of from about 50 to about 98 weight %, such as from about 70 to about 98 weight %, based on the total weight of the recycled asphalt composition. The optional additional components may be present in the recycled asphalt composition in an amount of from about 0 to about 50 weight %, such as from about 0 to about 30weight %, based on the total weight of the recycled asphalt composition.

The HMA layer 26 includes a conventional asphalt mix and is formed in accordance with conventional techniques. For example, the conventional HMA may have 93-96% aggregates and 4%-7% asphalt or the asphalt mixture 16 described above. The mixing temperature may be from about 140 to about 190° C.

As alluded to above, the foamed asphalt composition as described herein provides the recycled asphalt layer 24 with maximized anti-rutting performance and, in embodiments, also provides maximized ITS performance. For example, in embodiments, the recycled asphalt layer 24 has anti-rutting performance of at least 5000 cycles/mm at a temperature of 60° C. Anti-rutting performance may be measured in accordance with T0719-2011 of the Industry Standard JTG E20-2011 Specification and Test Methods of Bitumen and Bituminous Mixture for Highway Engineering, China using a Wheel Tracking Machine having a wheel with a width of 5 centimeters. A pressure of 0.7 MPa is applied to the recycled asphalt layer 24 specimen having a length of 30 cm and a thickness of 5 cm. The wheel of the Wheel Tracking Machine moves at a speed of 42 passing per minute. The test is carried out for 1 hour and the rutting is observed at a predetermined interval of cycles. Anti-rutting performance is measured in average number of cycles required to create 1 mm depth of rutting in the last 15 minutes. In embodiments, the recycled asphalt layer 24 has an ITS of at least 0.45 MPa as measured in accordance with ASTM D6931-12.

As alluded to above, given the maximized anti-rutting and, optionally, maximized ITS performance of the recycled asphalt layer 24, it is believed that a thinner HMA layer may be employed while still achieving desired anti-rutting performance and, optionally, desired ITS performance of the asphalt pavement. More specifically, in embodiments, the HMA layer 26 has a thickness 28 of from 4 to less than 8 cm, the recycled asphalt layer 24 has a thickness 30 of from about 10 to about 18 cm, and the recycled asphalt layer 24 has anti-rutting performance of at least 5000 cycles/mm as measured in accordance with testing procedure as described above. In further embodiments, the additional polyethylene is also present and recycled asphalt layer 24 has an ITS of at least 0.45 MPa as measured in accordance with ASTM D6931-12.

Figure 3:
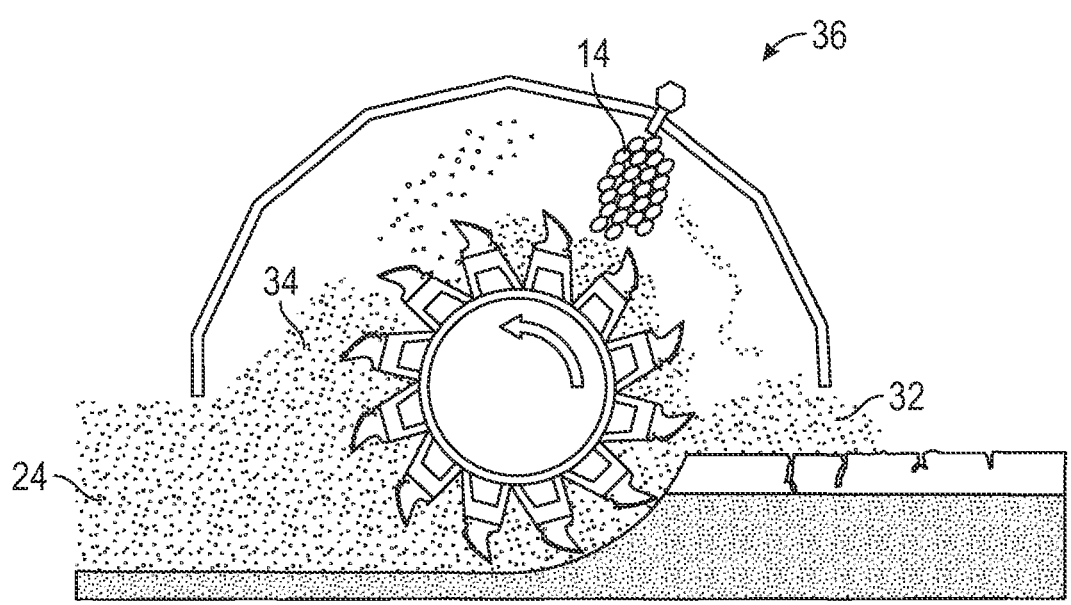
FIG. 3 is a schematic drawing of repaving equipment and process of forming asphalt pavement employing a cold-in-place technique in accordance with an embodiment.

In embodiments and referring to FIG. 3 with continued reference to FIGS. 1 and 2, the asphalt pavement 22 is formed using conventional repaving equipment 36 by combining the base asphalt component and the oxidized high density polyethylene to form the asphalt mixture 16 and foaming the asphalt mixture 16 using water 18 and compressed air 20 to form the foamed asphalt composition 14 as shown in FIG. 1 and as described above in regards the exemplary method of producing the foamed asphalt composition 14. Referring to FIG. 3, the foamed asphalt composition 14 and the recycled asphalt component 32 are combined to form the recycled asphalt composition 34. The recycled asphalt layer 24 is formed with the recycled asphalt composition 34. In embodiments, the steps of combining to form the asphalt mixture 16, foaming, combining to form the recycled asphalt composition 34, and forming the recycled asphalt layer 24 are conducted at ambient temperatures of from about 10° C. to about 50° C., although it is to be appreciated that the internal temperatures of the individual components and compositions may be significantly greater than 50° C°. In embodiments and although not shown in FIG. 3, the HMA layer 26 is formed over the recycled asphalt layer 24 through conventional techniques.

EXAMPLE A

Foamed asphalt compositions (FACs) are prepared by heating a base asphalt component to a temperature of about 160° C. (for purposes of Comp. FAC A in TABLE AI), followed by the addition of OxHDPE to form an asphalt mixture (for purposes of FAC A in TABLE AI). The respective base asphalt component and the asphalt mixture were provided to a foamed asphalt machine followed by foaming using water and compressed air to form the FACs. TABLE AI provides a listing of the components included in the FACs with all amounts in weight % based upon total weight of the FACs.

TABLE AI

|  | Base Asphalt Component | OxHDPE 1 | Water |
|---|---|---|---|
| Comp. FAC A | 97.56 | 0 | 2.44 |
| FAC A | 92.17 | 5.53 | 2.30 |

Base asphalt component is ZH70#, local Chinese base asphalt, with a penetration at 25° C. of from 60 to 80 (0.1 mm).
OxHDPE 1 is Honeywell Titan® 7686 having a density of 0.99 g/cm$^3$.

Viscosities of the asphalt mixtures (AM) including the components of the respective FACs listed in TABLE AI, inclusive of water, are set forth in TABLE AII and were measured at 60° C. and 160° C. in accordance with ASTM D4402.

TABLE AII

|  | Visc. @ 60° C. (Pas) | Visc. @ 160° C. (cP) |
|---|---|---|
| Comp. AM A | 198 | 135 |
| AM A | >50000 | 175 |

Recycled asphalt compositions were prepared using the foamed asphalt compositions shown in TABLE AI and recycled asphalt layers were formed from the recycled asphalt compositions. To prepare the recycled asphalt compositions, the asphalt mixtures (AM) were pumped to the foamed asphalt machine. Foamed asphalt compositions were formed and mixed with additional components as set forth in TABLE AIII below, with all amounts in weight % based upon total weight of the resulting recycled asphalt compositions.

TABLE AIII

|  | Comp. Ex. | Ex. |
|---|---|---|
| Comp. FAC .A | 2.50 | 0.00 |
| FAC.A | 0.00 | 2.50 |
| RAP | 76.56 | 76.56 |
| Active filler | 1.91 | 1.91 |
| Coarse fresh aggregate | 10.53 | 10.53 |
| Fine fresh aggregate | 8.61 | 8.61 |

Active fresh filler is cement.
Coarse Fresh Aggregate is aggregate with a normal size of from 10 mm-30 mm.
Fine Fresh Aggregate is aggregate with a normal size of from 0 mm-5 mm.

Physical properties of recycled asphalt layers formed from the recycled asphalt compositions were tested as shown in TABLE AIV. Anti-rutting performance may be measured in accordance with conventional testing using a Wheel Tracking Machine having a wheel with a width of 5 centimeters. A pressure of 0.7 MPa is applied to the recycled asphalt layer 24 specimen having a length of 30 cm and a thickness of 5 cm. The wheel of the Wheel Tracking Machine moves at a speed of 42 passing per minute. The test is carried out for 1 hour and the rutting is observed at a pre-determined interval of cycles. Anti-rutting performance is measured in number of cycles required to create 1 mm depth of rutting. ITS was measured in accordance with ASTM D6931-12. ITS ratio (ITSR) was measured as a ratio of wet ITS to dry ITS, with ITS measured in accordance with ASTM D6931-12. The wet ITS was measured by soaking the specimen in a 25° C. water bath for 24 hours.

TABLE AIV

|  | Comp. Ex. A | Ex. A |
|---|---|---|
| Anti-Rutting, cycles/mm | 4507 | 9267 |
| ITS, MPa | 0.42 | 0.37 |
| ITSR, % | 77 | 75 |

EXAMPLE B

In this Example, the FACs were prepared in the same manner as described above in EXAMPLE A, but with alternatives to the OxHDPE as well as combinations of OxHDPE and some additional polymers used. TABLE BI provides a listing of the components included in the FACs with all amounts in weight % based upon total weight of the FACs.

TABLE BI

|  | Base Asphalt Component | OxFT | OxLDPE | Homo. PE | OxHDPE 1 | OxHDPE 2 | Water |
|---|---|---|---|---|---|---|---|
| Comp. FAC B1 | 97.56 | 0 | 0 | 0 | 0 | 0 | 2.44 |
| Comp. FAC B2 | 92.17 | 5.53 | 0 | 0 | 0 | 0 | 2.30 |
| Comp. FAC B3 | 92.17 | 0 | 5.53 | 0 | 0 | 0 | 2.30 |
| Comp. FAC B4 | 92.17 | 0 | 0 | 5.53 | 0 | 0 | 2.30 |

TABLE BI-continued

| | Base Asphalt Component | OxFT | OxLDPE | Homo. PE | OxHDPE 1 | OxHDPE 2 | Water |
|---|---|---|---|---|---|---|---|
| FAC B1 | 92.17 | 0 | 0 | 0 | 5.53 | 0 | 2.30 |
| FAC B2 | 92.17 | 0 | 0 | 0 | 0 | 5.53 | 2.30 |
| FAC B3 | 92.17 | 0 | 2.76 | 0 | 2.76 | 0 | 2.30 |
| FAC B4 | 92.17 | 0 | 4.15 | 0 | 1.38 | 0 | 2.30 |
| FAC B5 | 92.17 | 0 | 0 | 2.76 | 2.76 | 0 | 2.30 |
| FAC B6 | 92.17 | 4.15 | 0 | 0 | 1.38 | 0 | 2.30 |

OxFT is oxidized Frisch-Tropsch wax.
OxHDPE 2 is Honeywell Titan® 7456 having a density of 0.98 g/cm$^3$.
OxLDPE is Honeywell Titan® 7183 oxidized LDPE having a density of 0.93 g/cm$^3$.
Homo. PE is Honeywell Titan® 7287 non-oxidized homopolymer polyethylene having a density of 0.91 g/cm$^3$.

Viscosities of the asphalt mixtures (AM) including the components of the respective FACs listed in TABLE AI, inclusive of water, are set forth in TABLE BII and were measured at 60° C. and 160° C. in accordance with ASTM D4402.

TABLE BII

| | Visc. @ 60° C. (Pas) | Visc. @ 160° C. (cP) |
|---|---|---|
| Comp. AM B1 | 198 | 135 |
| Comp. AM B2 | 136 | 101 |
| Comp. AM B3 | 515 | 126.7 |
| Comp. AM B4 | 883 | 125 |
| AM B1 | >50000 | 175 |
| AM B2 | >50000 | 192 |
| AM B3 | >50000 | 140.8 |
| AM B4 | 31000 | 135 |
| AM B5 | 42800 | 146 |
| AM B6 | 41080 | 115.8 |

Recycled asphalt compositions were prepared using the foamed asphalt compositions shown in TABLE BI and recycled asphalt layers were formed from the recycled asphalt compositions in the same manner as described above in EXAMPLE A. To form the recycled asphalt compositions, foamed asphalt compositions were formed and mixed with additional components as set forth in TABLE BIII below, with all amounts in weight % based upon total weight of the resulting recycled asphalt compositions.

TABLE BIII

| | Comp. Ex. B1 | Ex. B1 | Ex. B2 | Ex. B3 | Ex. B4 | Ex. B5 |
|---|---|---|---|---|---|---|
| Comp. FAC B1 | 2.5 | 0 | 0 | 0 | 0 | 0 |
| FAC B1 | 0 | 2.5 | 0 | 0 | 0 | 0 |
| FAC B3 | 0 | 0 | 2.5 | 0 | 0 | 0 |
| FAC B4 | 0 | 0 | 0 | 2.5 | 0 | 0 |
| FAC B5 | 0 | 0 | 0 | 0 | 2.5 | 0 |
| FAC B6 | 0 | 0 | 0 | 0 | 0 | 2.5 |
| RAP | 76.56 | 76.56 | 76.56 | 76.56 | 76.56 | 76.56 |
| Active Filler | 1.91 | 1.91 | 1.91 | 1.91 | 1.91 | 1.91 |
| Coarse Fresh Aggregate | 10.53 | 10.53 | 10.53 | 10.53 | 10.53 | 10.53 |
| Fine Fresh Aggregate | 8.61 | 8.61 | 8.61 | 8.61 | 8.61 | 8.61 |

Physical properties of recycled asphalt layers formed from the recycled asphalt compositions were tested as shown in TABLE BIV. Anti-rutting performance, ITS, and ITSR was measured as set forth above in the context of Example A.

TABLE BIV

|  | Comp. Ex. B1 | Ex. B1 | Ex. B2 | Ex. B3 | Ex. B4 | Ex. B5 |
|---|---|---|---|---|---|---|
| Anti-Rutting, cycles/mm | 3044 | 6019 | 6966 | 3929 | 3234 | 3619 |
| ITS, MPa | 0.48 | 0.41 | 0.51 | 0.56 | 0.54 | 0.54 |
| ITSR, % | 77.5 | 89 | 88.5 | 75 | 77.8 | 75 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of forming asphalt pavement, said method comprising the steps of:
    combining a base asphalt component, an oxidized high density polyethylene, and an additional polyethylene different from the oxidized high density polyethylene and selected from non-oxidized polyethylene homopolymer, oxidized low density polyethylene, and a combination thereof to form an asphalt mixture, wherein the mixture has a viscosity of at least about 30,000 Pa·s at a temperature of 60° C. and a viscosity of less than about 150 cP at a temperature of 160° C., wherein viscosity is determined in accordance with ASTM D4402;
    foaming the asphalt mixture using water and compressed air to form a foamed asphalt composition;
    combining the foamed asphalt composition and a recycled asphalt component to form a recycled asphalt composition; and
    forming a recycled asphalt layer with the recycled asphalt composition.

2. The method of claim 1, wherein the oxidized high density polyethylene has a density of from about 0.97 to about 1.01 g/cm³.

3. The method of claim 1, further comprising forming a hot mix asphalt layer over the recycled asphalt layer.

4. The method of claim 1, wherein the additional polyethylene is oxidized low density polyethylene having a density of from about 0.84 to about 0.95 g/cm³.

5. The method of claim 1, wherein the additional polyethylene is non-oxidized polyethylene homopolymer having a density of from about 0.87 to about 0.98 g/cm³.

6. The method of claim 1, where a combined amount of all polymeric species present in the foamed asphalt composition is from about 2 to about 10.5 weight % based upon a total weight of the foamed asphalt composition on a dry basis.

7. The method of claim 1, wherein the oxidized high density polyethylene and the additional polyethylene are present in the foamed asphalt composition in a weight ratio of from about 1:2 to about 2:1.

8. The method of claim 1, wherein the recycled asphalt layer is formed to have an indirect tensile strength of at least 0.45 Mpa as measured in accordance with ASTM D6391-12.

9. The method of claim 3, wherein the hot mix asphalt layer has a thickness of from 4 to less than 8 cm, the recycled asphalt layer has a thickness of from about 10 to about 18 cm, and the recycled asphalt layer has anti-rutting performance of at least 5000 cycles/mm at 60° C. in accordance with T0719-2011 of the Industry Standard JTG E20-2011 Specification and Test Methods of Bitumen and Bituminous Mixture for Highway Engineering, China.

10. The method of claim 1, wherein the steps of combining to form the asphalt mixture, foaming, combining to form the recycled asphalt composition, and forming the recycled asphalt layer are conducted at ambient temperatures of no greater than about 50° C.

11. The method of claim 1, wherein foaming the asphalt mixture comprises introducing the asphalt mixture to a foam nozzle.

12. The method of claim 1, wherein water is present in the asphalt mixture in an amount of from about 2 to about 5 weight % based upon a total weight of all components present in the asphalt mixture.

* * * * *